United States Patent
Liu et al.

(10) Patent No.: US 11,404,948 B2
(45) Date of Patent: Aug. 2, 2022

(54) LINEAR VIBRATION MOTOR

(71) Applicant: TOPRAY MEMS INC., Hsinchu (TW)

(72) Inventors: Chin-Sung Liu, Hsinchu (TW);
Shin-Ter Tsai, Hsinchu (TW);
Hsiao-Ming Chien, Hsinchu (TW);
Chi-Ling Chang, Hsinchu (TW)

(73) Assignee: TOPRAY MEMS INC., Hsinchu (TW)

( * ) Notice: Subject to any disclaimer, the term of this patent is extended or adjusted under 35 U.S.C. 154(b) by 167 days.

(21) Appl. No.: 17/082,009

(22) Filed: Oct. 28, 2020

(65) Prior Publication Data
US 2022/0103050 A1 Mar. 31, 2022

(30) Foreign Application Priority Data
Sep. 28, 2020 (TW) ................. 109133669

(51) Int. Cl.
*H02K 33/16* (2006.01)
*H02N 2/02* (2006.01)
*B06B 1/04* (2006.01)
*H02K 33/10* (2006.01)

(52) U.S. Cl.
CPC ............ *H02K 33/16* (2013.01); *B06B 1/045* (2013.01); *H02K 33/10* (2013.01); *H02N 2/02* (2013.01)

(58) Field of Classification Search
CPC .......... B06B 1/00; B06B 1/02; B06B 1/0215; B06B 1/0223; B06B 1/0269; B06B 1/0614; B06B 1/04; B06B 1/045; H02K 33/00; H02K 33/02; H02K 33/14; H02K 33/16; H02K 33/18; H02K 35/00; H02K 35/04; H02N 2/02

USPC ....... 310/25, 15, 81, 80, 321, 20, 21, 28–30, 310/36–37, 12.01–12.27; 381/400–422; 359/824
See application file for complete search history.

(56) References Cited

U.S. PATENT DOCUMENTS

| 8,288,898 | B2 * | 10/2012 | Jun ........................ | H02K 33/16 310/34 |
| 8,878,401 | B2 * | 11/2014 | Lee ........................ | H02K 33/16 310/15 |
| 9,774,236 | B2 * | 9/2017 | Xu ........................ | H02K 33/04 |

(Continued)

FOREIGN PATENT DOCUMENTS

| CN | 204030834 U | * 12/2014 | ............. H02K 33/16 |
| CN | 104617735 A | * 5/2015 | ............. H02K 33/16 |

(Continued)

*Primary Examiner* — Maged M Almawri
(74) *Attorney, Agent, or Firm* — Lin & Associates Intellectual Property, Inc.

(57) ABSTRACT

A linear vibration motor is disclosed, including: a movable part, a suspension device, and a fixed part; wherein the movable part includes at least one magnet set, and the fixed part at least includes a coil, at least one magnetically conductive element and a housing; the magnet set and the coil and the magnetically conductive element of the fixed part are arranged with a gap. The magnetically conductive element is located above, below, or both above and below the magnet set; the suspension device includes two stripe springs, respectively located on both sides of the movable part, with one side of each stripe spring connected to the movable part, and the other side connected to the fixed part. When not actuated, the suspension device is a straight full-length stripe without bending at the connections at both ends.

9 Claims, 12 Drawing Sheets

(56) References Cited

U.S. PATENT DOCUMENTS

| | | | | |
|---|---|---|---|---|
| 9,935,535 | B2* | 4/2018 | Guo | H02K 33/16 |
| 9,936,302 | B2* | 4/2018 | Linghu | H04R 9/06 |
| 10,076,771 | B2* | 9/2018 | Xu | H02K 33/12 |
| 10,103,614 | B2* | 10/2018 | Guo | H02K 33/18 |
| 10,116,194 | B2* | 10/2018 | Mao | H02K 11/215 |
| 10,153,681 | B2* | 12/2018 | Mao | H02K 33/16 |
| 10,158,278 | B2* | 12/2018 | Mao | H02K 33/16 |
| 10,270,304 | B2* | 4/2019 | Wang | H02K 33/16 |
| 10,307,791 | B2* | 6/2019 | Xu | B06B 1/045 |
| 10,710,115 | B2* | 7/2020 | Huang | H02K 33/02 |
| 10,797,576 | B2* | 10/2020 | Wu | H02K 33/18 |
| 10,971,984 | B2* | 4/2021 | Liu | H02K 33/10 |
| 11,201,531 | B2* | 12/2021 | Jin | H02K 33/16 |
| 2011/0198949 | A1* | 8/2011 | Furuich | H02K 33/16 310/25 |
| 2011/0241451 | A1* | 10/2011 | Park | B06B 1/045 310/25 |
| 2012/0169148 | A1* | 7/2012 | Kim | H02K 33/16 310/25 |
| 2015/0123498 | A1* | 5/2015 | Yang | H02K 33/16 310/25 |
| 2016/0013710 | A1* | 1/2016 | Dong | H02K 33/16 310/25 |
| 2016/0226358 | A1* | 8/2016 | Mao | H02K 33/16 |
| 2016/0226359 | A1* | 8/2016 | Guo | H02K 33/16 |
| 2016/0254736 | A1* | 9/2016 | Jin | H02K 33/16 310/25 |
| 2017/0120298 | A1* | 5/2017 | Mao | B06B 1/045 |
| 2017/0222532 | A1* | 8/2017 | Wang | H02K 33/16 |
| 2018/0248457 | A1* | 8/2018 | Shi | F16F 15/08 |
| 2018/0297076 | A1* | 10/2018 | Xu | B06B 1/045 |
| 2018/0351442 | A1* | 12/2018 | Liu | H02K 33/14 |
| 2018/0358879 | A1* | 12/2018 | Liu | H02K 1/34 |
| 2019/0036435 | A1* | 1/2019 | Zhu | H02K 33/02 |
| 2019/0044425 | A1* | 2/2019 | Zu | H02K 33/18 |
| 2019/0052160 | A1* | 2/2019 | Oi | H02K 33/02 |
| 2019/0305637 | A1* | 10/2019 | Suzuki | H02K 7/063 |
| 2020/0044526 | A1* | 2/2020 | Tang | H02K 33/18 |
| 2021/0211030 | A1* | 7/2021 | Li | H02K 33/18 |

FOREIGN PATENT DOCUMENTS

| | | | | |
|---|---|---|---|---|
| CN | 204334277 U | * | 5/2015 | |
| CN | 106026603 A | * | 10/2016 | H02K 33/00 |
| CN | 205847047 U | * | 12/2016 | |
| CN | 206195578 U | * | 5/2017 | |
| CN | 206878668 U | * | 1/2018 | |
| CN | 207559830 U | * | 6/2018 | |
| CN | 209313684 U | * | 8/2019 | |
| JP | 2017118805 A | * | 11/2017 | |
| WO | WO-2021114307 A1 | * | 11/2021 | |

* cited by examiner

LINEAR VIBRATION MOTOR

BACKGROUND OF THE INVENTION

1. Field of the Invention

The present invention relates generally to a linear vibration motor.

2. The Prior Arts

With the popularization of smart mobile devices, such as mobile phones, tablets and wearable devices, linear vibration motors are often used as the vibration source because of faster response and more power-saving advantages, and has long been considered as the mainstream touch feedback technology. In the trend of thinner and lighter electronic products, how to increase the magnetic field strength and maintain the lifespan of the product under the thinner and lighter conditions has become an increasingly focus of the specifications of linear vibration motors.

The traditional linear vibration motor structure comprises basically a movable part, a fixed part, and a suspension system. For example, in the simplest embodiment, the movable part can be a magnet set, the fixed part is a coil set and the suspension system is a spring set. In other words, the structure of the linear vibration motor determines that the vibration mode is that the magnet set is controlled by the coil set, and moves relative to the coil set in a linear manner to reach the resonance frequency. In addition, in linear vibration motors, at least one magnetically conductive element is often provided in the fixed portion to improve the vibration effect.

With the reduced thickness of the product, the product is compressed in the thickness dimension. The first thing under impact is to reduce the thickness of the magnet and the coil, which directly causes the decrease of the magnetic field strength. To overcome this phenomenon, the current technology often relies on adding magnetic elements to increase the magnetic field strength of the product. The added magnetic elements can guide the magnetic lines of force through the coil to the maximum. However, although this technical solution is effective, it also causes other problems.

Figure 1A:
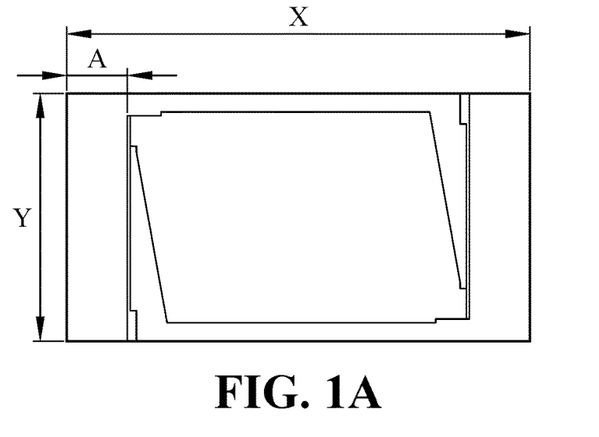
FIGS. 1A-1C are schematic views of sheet suspension springs, L-shaped suspension springs, and C-shaped suspension springs.
Figure 1B:
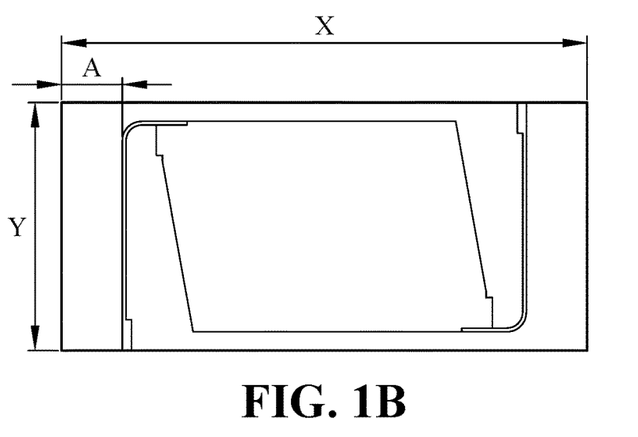
Figure 1C:
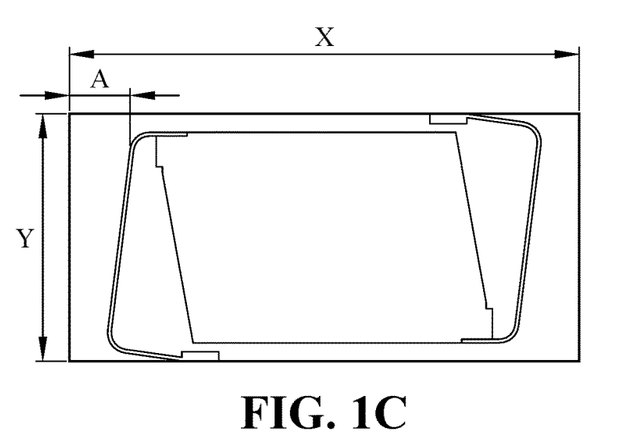

For example, adding a magnetic element can effectively increase the magnetic field strength, but the relative magnetic attraction also causes a burden on the suspension system of the linear vibration motor. FIGS. 1A-1C show sheet suspension springs, L-shaped suspension springs, and C-shaped suspension springs. In order to achieve the goal of parallel movement, the configuration of elastic sheet suspension devices is mostly U-shaped or C-shaped. U-shaped and C-shaped elastic sheet has configurative turning features. Table 1 shows the natural frequencies of different elastic sheet-type suspension system configurations. When the rigidity of the elastic sheet suspension system configuration is stronger, the natural frequency is higher. Therefore, the more turning features, the weaker the rigidity of the elastic sheet in the UZ direction (perpendicular to the XY plane), as shown in FIGS. 1A, 1B, 1C, the carrier and distance Y, A are the same; X is the length of the turning point of the two side elastic sheet+2*A.

TABLE 1

| Natural frequency | elastic sheet-type suspension system configuration | | |
|---|---|---|---|
| Frequency(Hz) | Sheet-shaped | L-shaped | C-shaped |
| UX | 216.3 | 176.7 | 121.2 |
| UZ | 3198.0 | 1745.9 | 397.3 |

There are two solutions to overcome the lack of rigidity in the UZ direction of the elastic sheet:

The first one is, according to the UZ rigidity that the suspension system can withstand, to match the corresponding magnetic element in size and gap; the advantage of this approach is to effectively increase the magnetic field strength, but the disadvantage is that the UZ rigidity factor of the suspension system needs to retain the gap, resulting in reduced permeability of the magnetic element, and the thickness of the product design is also limited.

The second approach is to add other UZ rigid support elements, such as shafts, the number of elastic sheets, magnetic fluid and other elements; the advantage of this approach is that the magnetic element can be placed at locations to guide the magnetic force lines to pass through the coil. The disadvantages includes: prone to increase in assembly defects, friction (non-linearity), material properties and other derivative design problems. Specifically, when shaft components are added, there will be a limit on the thickness of the structure, and friction (non-linear) problems will occur; when the number of elastic sheets is increased, assembly defects will increase and the product will be limited in length and width; when magnetic fluid (physical damping) is added, it will be easily affected by temperature, and product characteristics and temperature reliability will be limited.

Therefore, under the premise of thinner linear vibration motor products, with the goal of increasing the magnetic field strength of the product, the challenge faced by the industry is how to design a linear vibration motor without increasing the supporting elements except for the elastic sheet and the magnetic element so that the magnetic element is placed in a position to guide the magnetic lines of force to maximize the passage of the coil.

SUMMARY OF THE INVENTION

An embodiment of the present invention discloses a linear vibration motor, comprising: a movable part, a suspension device, and a fixed part; wherein the movable part further comprising at least one magnet set, the magnet set comprising at least three magnets arranged spaced apart, the magnets having an up-and-down magnetization direction, the adjacent magnets having opposite polarities when arranged; the fixed part at least comprising: a coil, at least one magnetically conductive element, and a housing; the magnet set of the movable part and the coil and the magnetically conductive element of the fixed part being arranged opposite to each other with a gap, both polar surfaces at both sides of the magnet set being facing opposite to the coil and the magnetically conductive element of the fixed part, and the size of the magnetically conductive element of the fixed part in the non-moving direction being greater than the size of the magnet set in the non-moving direction; the at least one magnetically conductive element being located above or below the magnet set; when the number of the at least one magnetically conductive element exceeding one, the magnetically conductive element being respectively arranged above and below the magnet set; the suspension device comprising two elastic stripes respectively located on both sides of the movable part, with one side of each elastic stripe connected to the movable part and the other side connected to the fixed part so that the movable part being supported by the suspension device and able to move freely relative to the fixed part; each of connecting ends of the elastic stripe having a height the same as the heights of the connecting ends of the movable part and the fixed part so that the suspension device staying in a straight and flat shape without bending at both connecting ends.

In a preferred embodiment, at least one hole is provided on the magnetically conductive element.

In a preferred embodiment, the hole is a rectangular hole, and the four sides of the hole are respectively parallel to the four sides of the magnet set; and under the condition that the width of the hole is fixed, $0\leq$ the length of the hole $\leq 3/4$ of the length of the Z-opposite magnet; under the condition that the length of the hole is fixed, $0\leq$ the width of the hole $\leq 2/3$ of the width of the Z-opposite magnet; wherein the Z-opposite magnet is defined as the magnet opposite to the hole in the Z direction and causing magnetic force change when the hole moves.

In a preferred embodiment, the hole is a notch-type hole that cuts off the upper or lower edge of the magnetically conductive element; and the magnetically conductive element with notch-type hole uses end surfaces of the notch-type hole and end surfaces of the magnetically conductive element as end surfaces.

In a preferred embodiment, the holes of different types on the magnetically conductive element can be stacked on one another to form a composite hole; the composite hole is the joint area after two or more holes overlap, and the holes can be superimposed on one side or both sides, and the composite hole can be a closed hole or a notch-type hole.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 2:
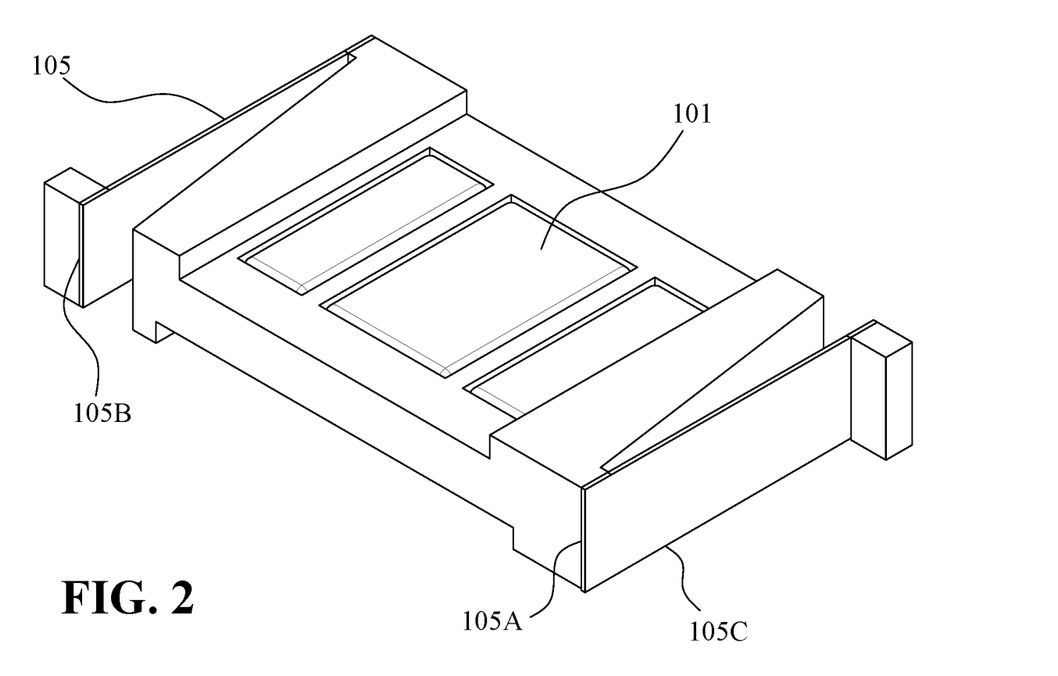
FIG. 2 is a schematic view showing the connection between the movable part and the suspension device of the linear vibration motor of the present invention.
Figure 3:
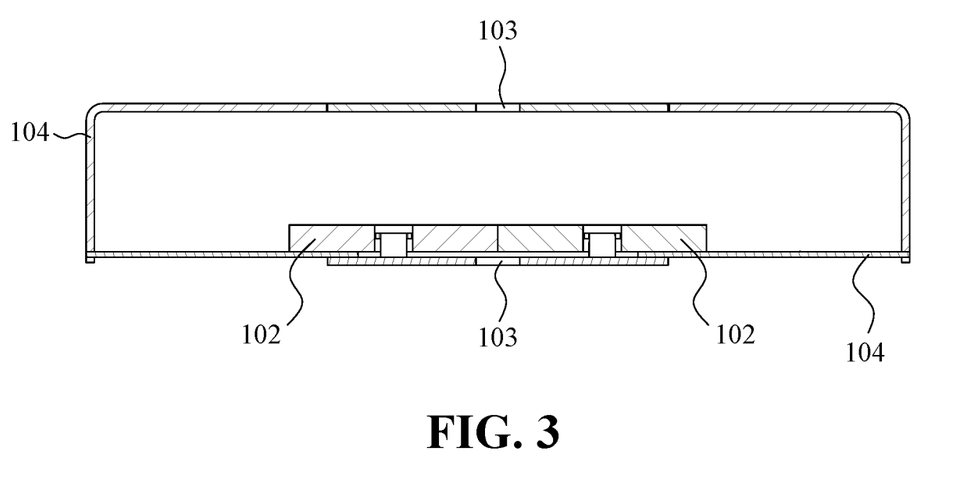
FIG. 3 is a schematic cross-sectional view of the structure of the fixed part of the linear vibration motor of the present invention.

Refer FIG. 2 and FIG. 3. The present invention provides a linear vibration motor, comprising: a movable part, a suspension device, and a fixed part. FIG. 2 is a schematic view showing the connection between the movable part and the suspension device of the linear vibration motor of the present invention; FIG. 3 is a schematic cross-sectional view of the structure of the fixed part of the linear vibration motor of the present invention. As shown in FIG. 2 and FIG. 3, the movable part further comprises at least one magnet set, and the magnet set comprises at least three magnets 101 arranged spaced apart. The magnets have an up-down magnetization direction and adjacent magnets have opposite polarities. The fixed part at least comprises: a coil 102, at least one magnetically conductive element 103, and a housing 104. The magnet set of the movable part and the coil and the magnetically conductive element of the fixed part are arranged opposite to each other with a gap, both polar surfaces at both sides of the magnet set are facing opposite to the coil and the magnetically conductive element of the fixed part, and the size of the magnetically conductive element of the fixed part in the non-moving direction is greater than the size of the magnet set in the non-moving direction. The at least one magnetically conductive element is located above or below the magnet set; when the number of the at least one magnetically conductive element is more than one, the magnetically conductive elements can be respectively arranged above and below the magnet set. The suspension device comprises two elastic stripes 105 respectively located on both sides of the movable part, with one side of each elastic stripe 105 connected to the movable part and the other side connected to the fixed part so that the movable part is supported by the suspension device and able to move freely relative to the fixed part. The connecting ends of each elastic stripe 105 are referred to as a movable part connecting end 105A and a fixed part connecting end 105B, respectively. As shown in FIG. 2, the connecting ends 105A, 105B of the elastic stripe 105 has a height the same as the heights of the connecting ends of the movable part and the fixed part so that the suspension device stays in a straight and flat shape, as full-length 105C, without bending at both connecting ends.

Figure 4:
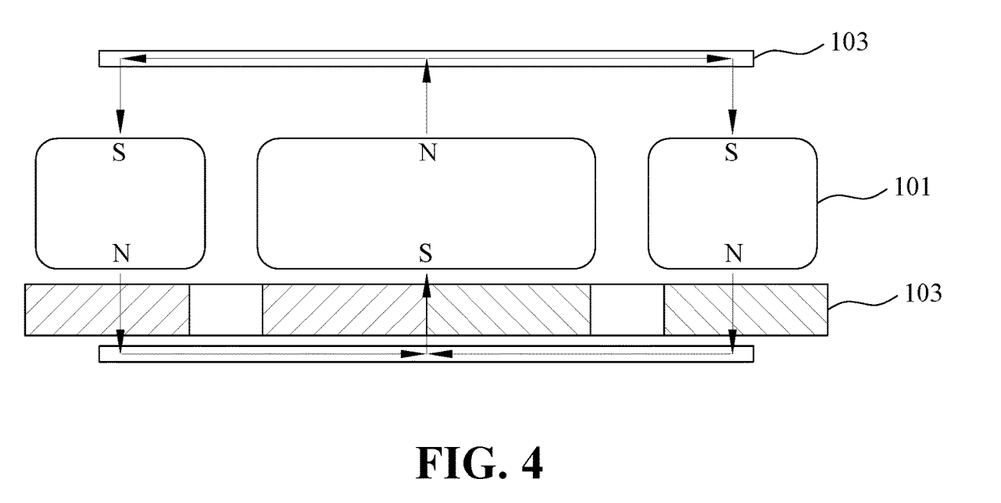
FIG. 4 is a schematic view of an approximately closed magnetic loop formed by the magnet set and the magnetically conductive element of the linear vibration motor of the present invention.
Figure 5A:
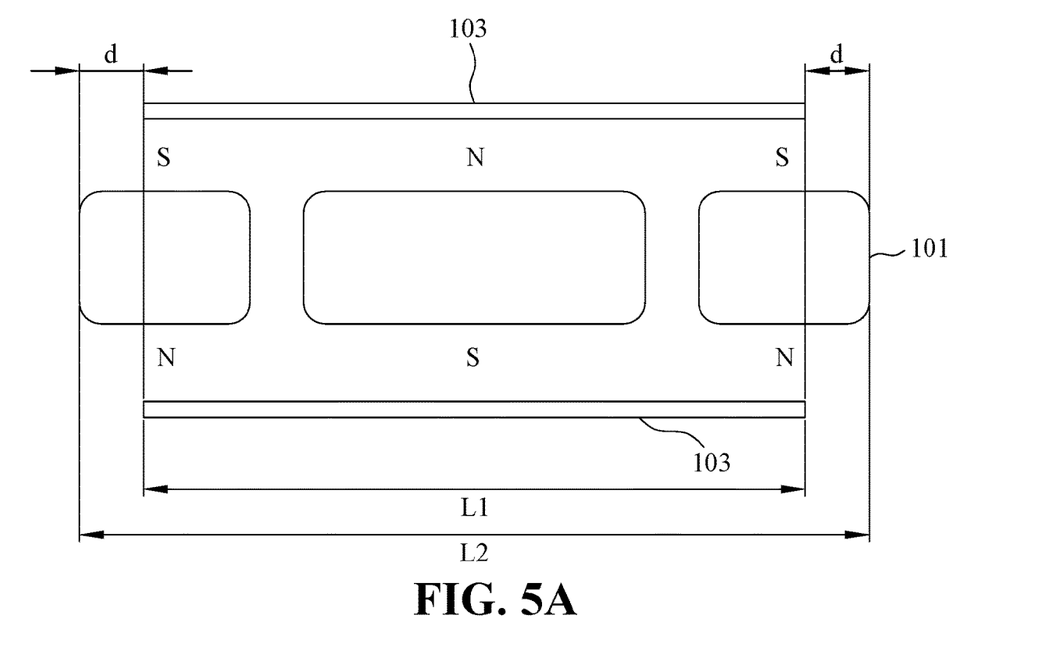
FIG. 5A is a schematic diagram showing the arrangement of the magnetically conductive element and the magnet set of the linear vibration motor of the present invention.
Figure 5B:
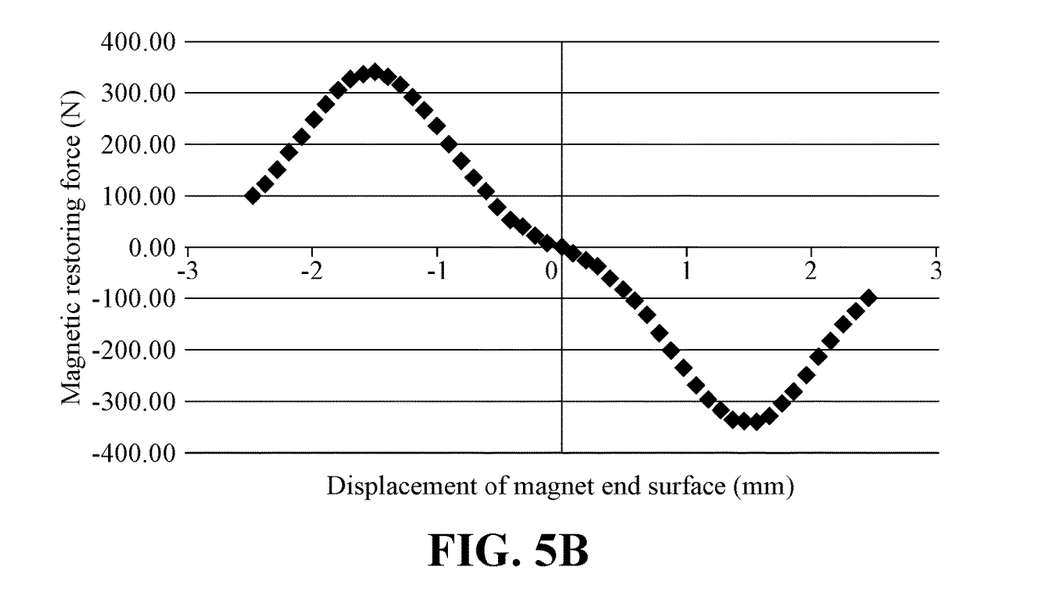
FIG. 5B is a schematic view showing the relationship between the magnetic restoring force and the displacement distance of the magnet end surface of the linear vibration motor of the present invention.

FIG. 4 shows a schematic view of an approximately closed magnetic loop formed by the magnet set and the magnetically conductive element of the linear vibration motor of the present invention; FIG. 5A is a schematic diagram showing the arrangement of the magnetically conductive element and the magnet set of the linear vibration motor of the present invention; FIG. 5B is a schematic view showing the relationship between the magnetic restoring force and the displacement distance of the magnet end surface of the linear vibration motor of the present invention; wherein L1 is the length of the magnetically conductive element, L2 is the length of the magnet set, and d is the displacement distance of the magnet end surface.

It is worth noting that in the vibration process, between the magnet set of the movable part and the coil and the magnetically conductive element of the fixed part, the Lorentz force generated by the action of the magnetic field of the magnet set of the movable part when a current is applied to the coil will cause the movable part and the suspension device move. In addition, because the magnetically conductive element and the magnet set form a nearly closed magnetic loop as shown in FIG. 4; when the movable part and the suspension device are displaced, an additional magnetic restoring force is provided to the movable part with respect to the fixed part, as shown in FIG. 5B, the magnetic restoring force can assist the elastic stripe 105 of the suspension device to bring the movable part back to its mechanical origin.

In order to increase the strength of the magnetic field, the magnetically conductive element of the present invention must be placed the at the position to maximize the passage of the magnetic flux to be guided through the coil, and the aforementioned problem of insufficient UZ rigidity of the elastic stripe must be overcome. The main operation principle is explained as follows:

By deriving from the formula of second moment of inertia:

$$Kz/Kx=Iz/Ix=(bh^3/12)/(b^3h/12)=(h/b)2$$

Wherein, b is the width of the elastic stripe, that is, UX, h is the thickness of the elastic stripe, that is, UZ, and K is the spring constant of the elastic stripe. In other words, the greater the ratio difference between h and b is, the stronger the rigidity of the elastic stripe in the UZ direction. Based on the above, the shape and specifications of the elastic stripe will be constructed so that the rigidity of the elastic stripe in the UZ direction can support the increased the magnetic attraction force in the UZ direction due to the addition of the magnetically conductive element.

However, by increasing the thickness direction dimension of the elastic stripe to satisfy the increase in rigidity in the UZ direction (that is, the increase in Kz), the problem of stress increase caused by the increase in the spring constant of the elastic stripe also arises. According to Hooke's Law: F=KX, under the condition of constant X, an increase in K will increase F. Since stress σ=F/A, an increase in F will increase stress σ. The stress increase problem will directly affect the elastic stripe of the linear vibration motor under the condition of repeating back-and-forth stroke, and the faster the elastic stripe will be damaged due to mechanical fatigue.

Due to the aforementioned fatigue damage, the present invention needs to add a spring constant (Km) to the elastic system of the linear vibration motor in addition to the existing suspension device under the existing structure of the linear vibration motor (in other words, no additional supporting elements are further added) to reduce the spring constant of the existing suspension device (that is, the elastic stripe) from Ks to Ks'; that is, Ks=Ks'+Km, so that Ks'<Ks, to achieve the objective of reducing stress, thereby reducing the effect of fatigue damage to the elastic stripe.

Therefore, as mentioned above, the present invention forms a nearly closed magnetic loop by the magnetically conductive element group and the magnet set, so that when the movable part is displaced, the movable part is provided with a distance between the movable part and the fixed part. The magnetic restoring force makes the movable part return to its mechanical origin. More specifically, the magnetic restoring force can be used as the spring constant (Km) in addition to the suspension device, so that the elastic system of the linear vibration motor does not need to rely on the suspension device to completely withstand the repeating back-and-forth stroke, i.e., the vibration.

Furthermore, when the end surfaces of the magnetically conductive element and the magnet set are aligned (d=0), the magnetic restoring force provided by the magnetically conductive element of the fixed part to the magnet set of the movable part is zero; when the magnet set of the movable part is displaced to the right, the right end surface of the magnet set will interact with the right end surface of the magnetically conductive element due to the magnetic attraction force generated by the magnetic field guidance, causing the magnet set of the movable part to generate a restoring force in the direction to move left; when the magnet set of the movable part is displaced to the left, the corresponding restoring force is provided in the opposite direction.

However, when the magnetic restoring force provided by both sides of the magnetically conductive element and the magnet set still cannot meet the design requirements of Km, under the premise that the magnet set contains at least 3 magnets, the present invention can add holes to the design of the magnetically conductive element, and the aforementioned magnetic attraction force can be changed by the addition of this technical feature.

Figure 6A:
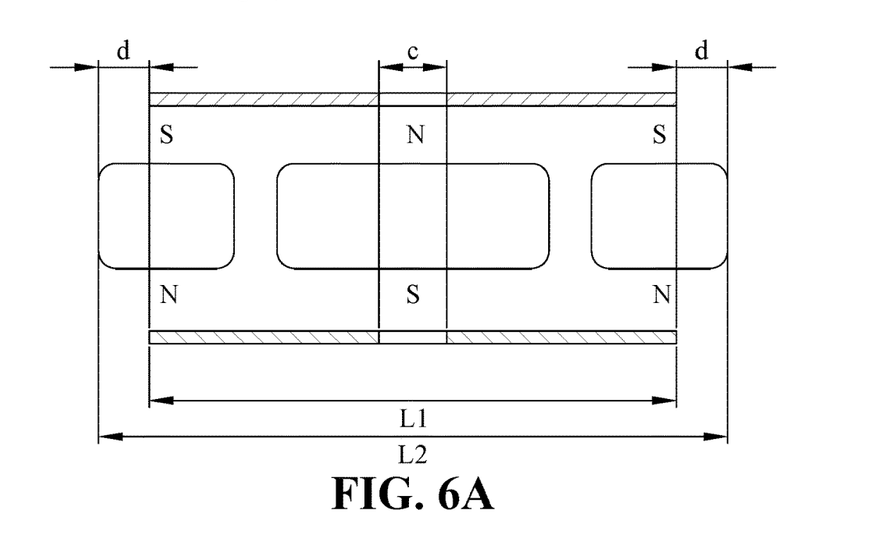
FIGS. 6A-6C are schematic views showing holes disposed on the magnetically conductive element of the linear vibration motor of the present invention
Figure 6B:
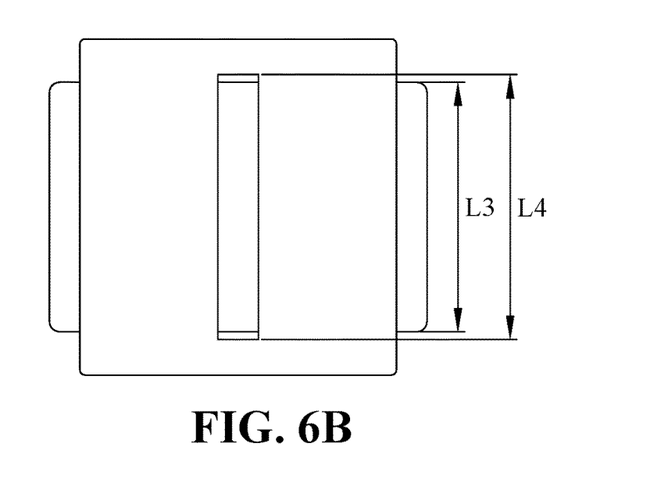
Figure 6C:
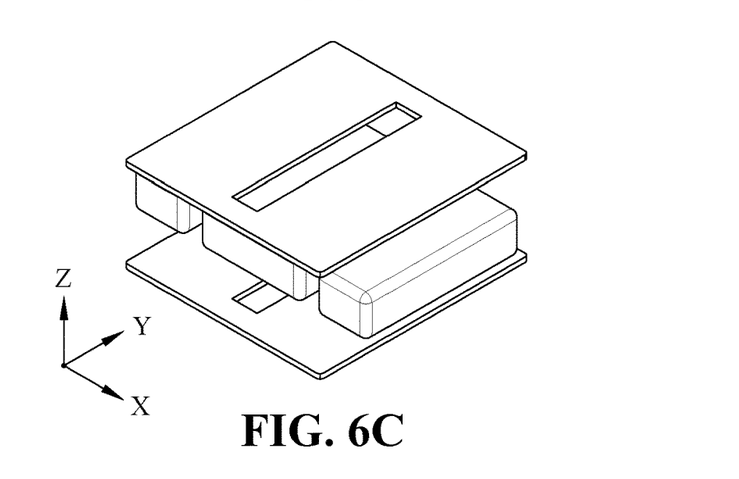
Figure 7A:
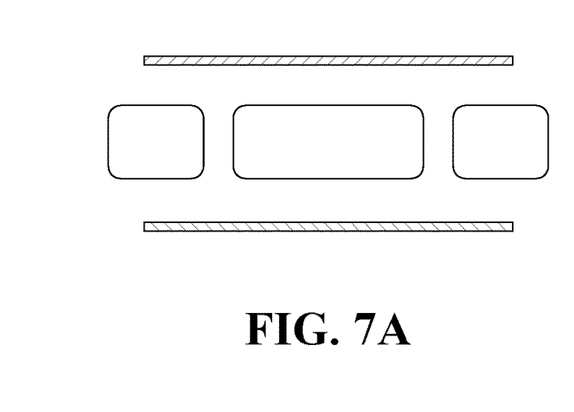
FIGS. 7A-7F show schematic views of various implementations of the magnetically conductive element under the condition that the hole width and the external size are fixed.
Figure 7B:
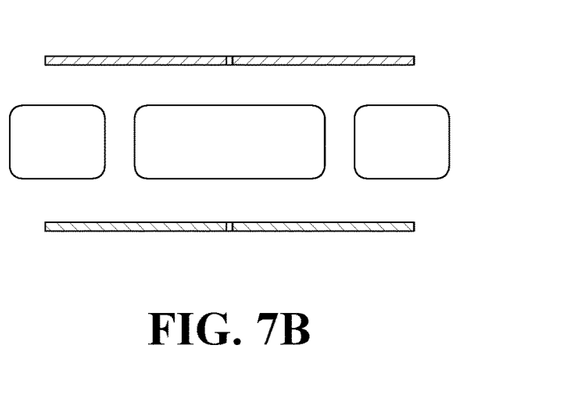
Figure 7C:
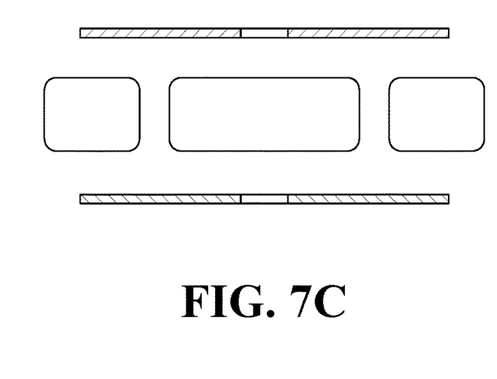
Figure 7D:
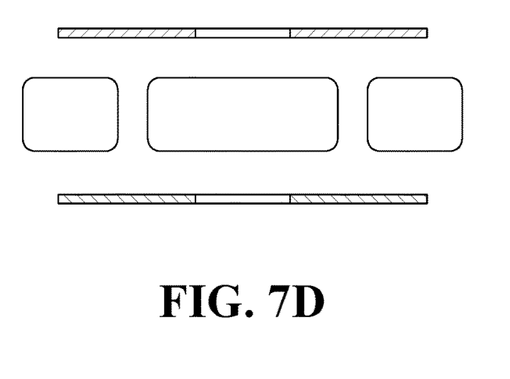
Figure 7E:
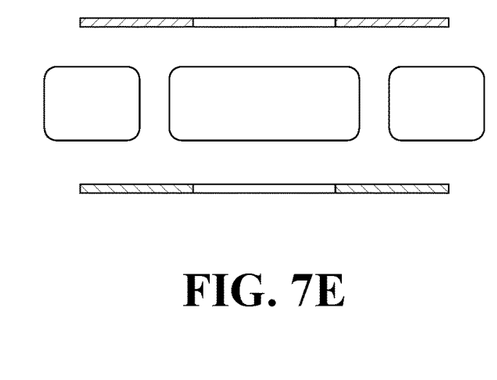
Figure 7F:
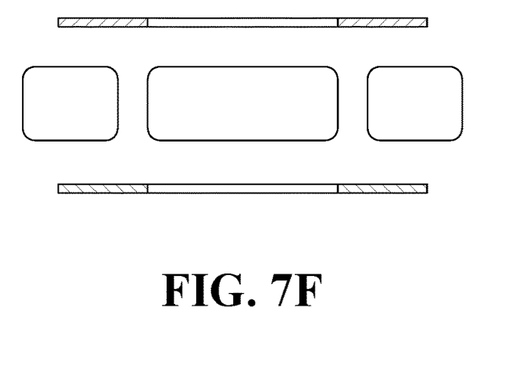

FIGS. 6A-6C are schematic views showing holes disposed on the magnetically conductive element of the linear vibration motor of the present invention. As shown in FIGS. 6A-6C, the present invention can increase the required magnetic restoring force by increasing the magnetic attraction force generated by the X and Y direction end surfaces and the magnet set by providing holes in the magnetically conductive element. Moreover, the magnetically conductive element with hole will also reduce the magnetic attraction force in the UZ direction, which can also achieve the effect of reducing the Ks' design requirement. Furthermore, the desired magnetic attraction can also be adjusted by changing the position of the hole and the size of the hole; wherein, the X direction is defined as the length direction, the Y direction is defined as the width direction, and the direction perpendicular to the XY plane is the Z direction; c is the size of the hole in the X direction (length), and L4 is the size of the hole in the Y direction (width), L3 is the size of the magnet set in the Y direction (width). Since the core technical feature of the present invention is to increase the required magnetic restoring force by increasing the magnetic attraction generated by the X and Y direction end surfaces and the magnet set by providing holes in the magnetically conductive element, the magnet that will cause magnetic force change when the hole moves is defined as the magnet opposite to the hole in the Z direction, or briefly as Z-opposite magnet; in other words, the Z-opposite magnet of the hole means that when no actuated, the magnet hole have an overlapped area in the Z direction, and the projection of the magnet in the Z direction should overlap the boundary of the hole.

Figure 8A:
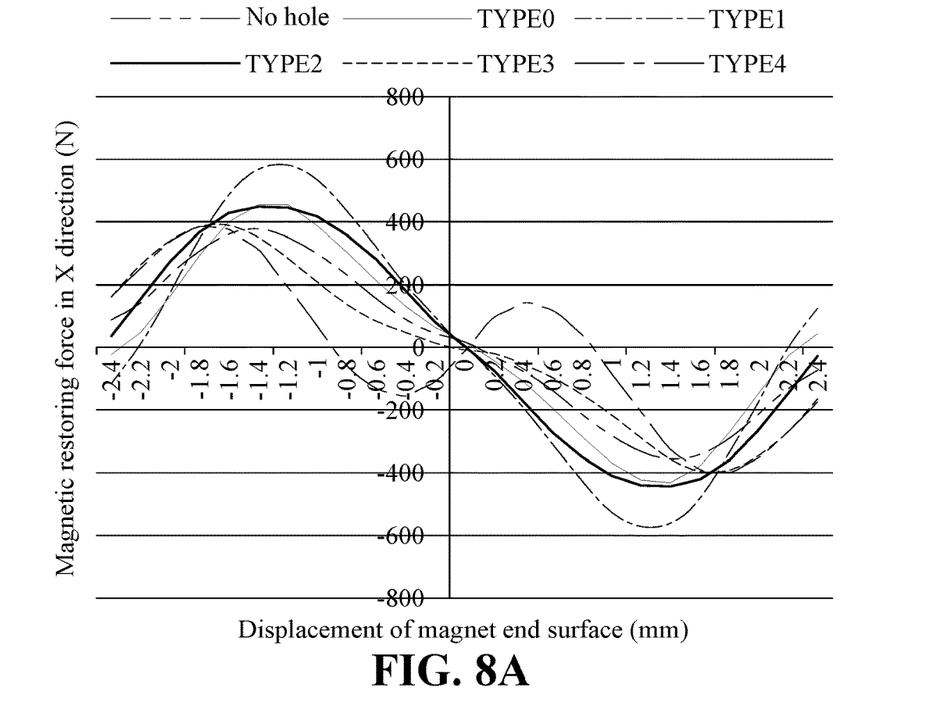
FIGS. 8A-8B are schematic views of the relationship between the magnetic restoring forces in the X direction and the Z direction and the displacement distance of the magnet end surface under a fixed hole width.
Figure 8B:
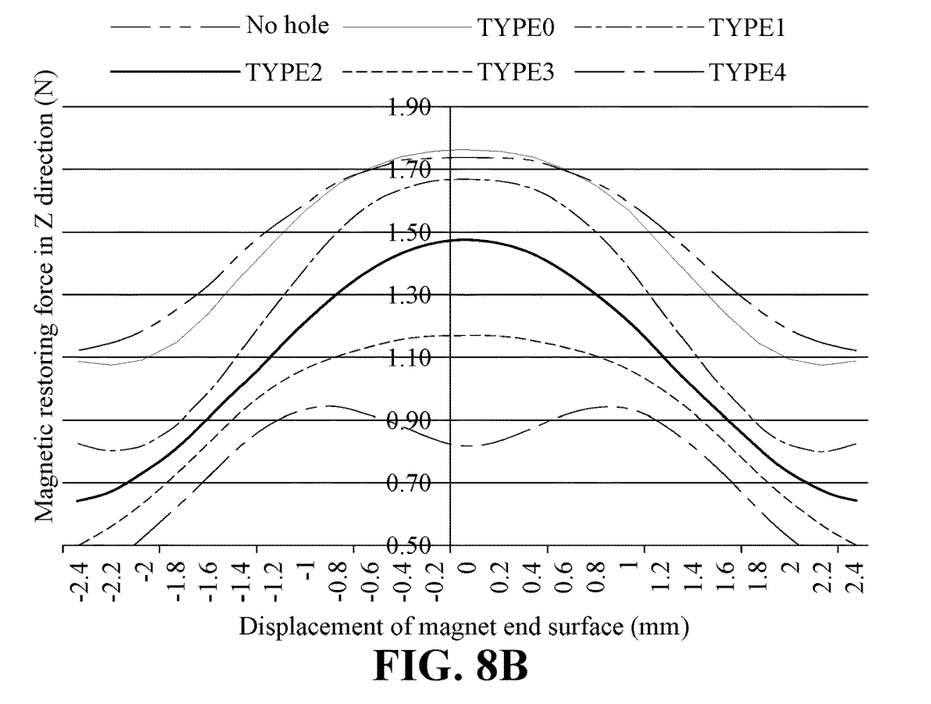
Figure 9A:
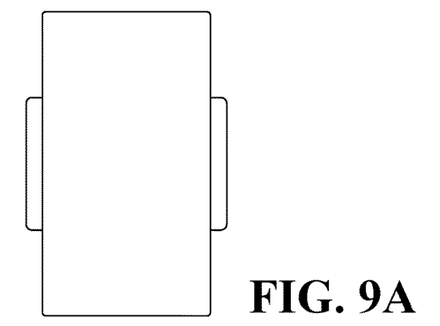
FIGS. 9A-9H show schematic views of various implementations of the magnetically conductive element under the condition that the length of the hole and the external dimension are fixed.
Figure 9B:
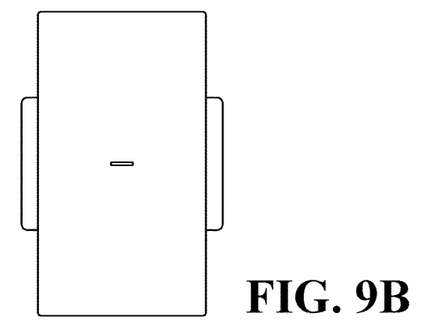
Figure 9C:
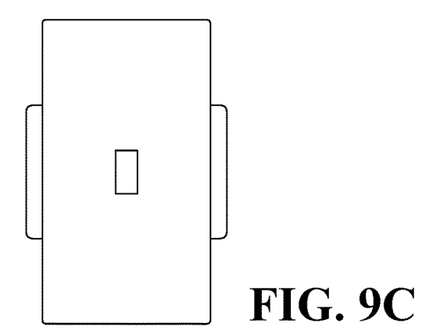
Figure 9D:
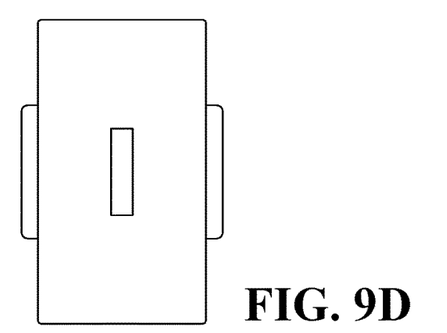
Figure 9E:
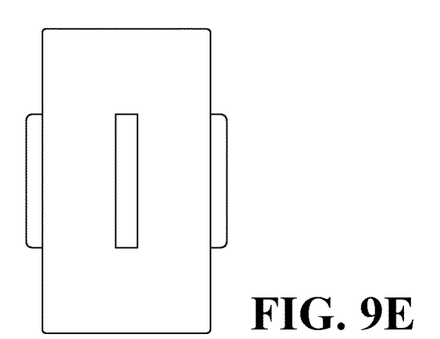
Figure 9F:
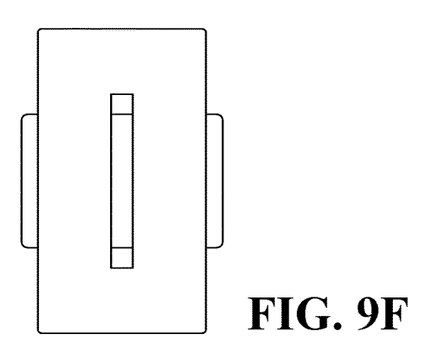
Figure 9G:
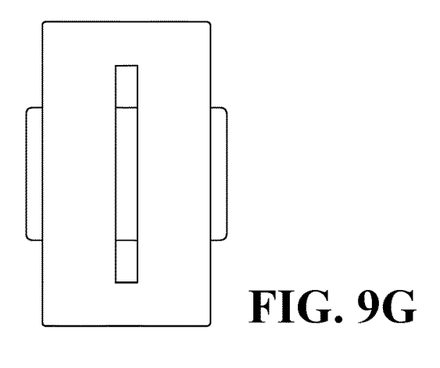
Figure 9H:
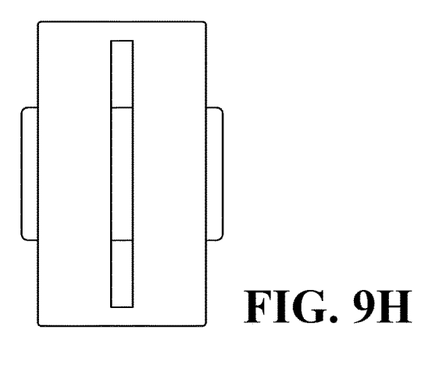
Figure 10A:
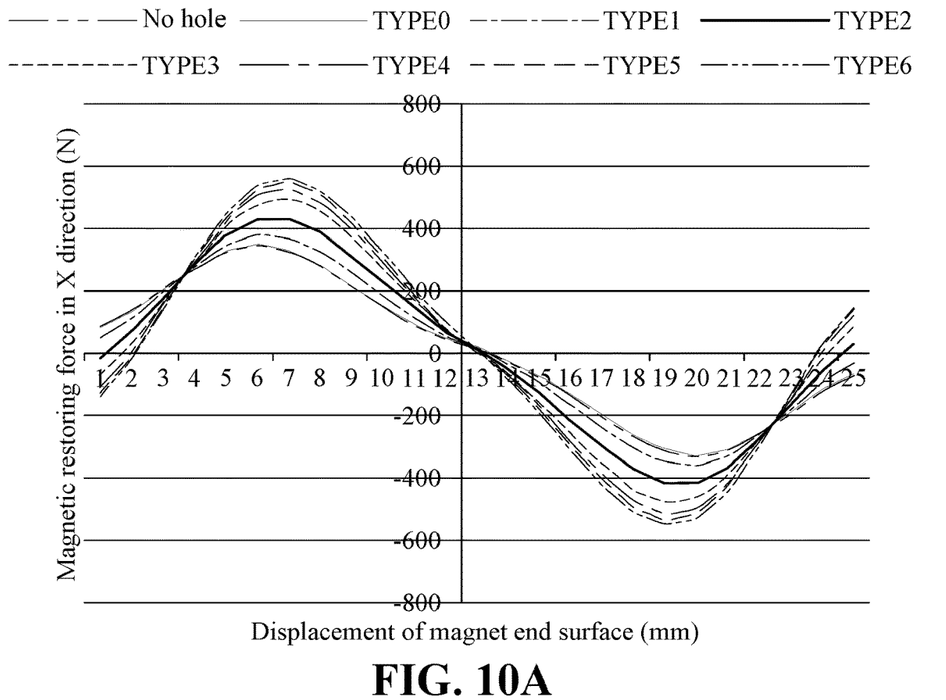
FIGS. 10A-10B are schematic views of the relationship between the magnetic restoring forces in the X direction and the Z direction and the displacement distance of the magnet end surface under the fixed hole length.
Figure 10B:
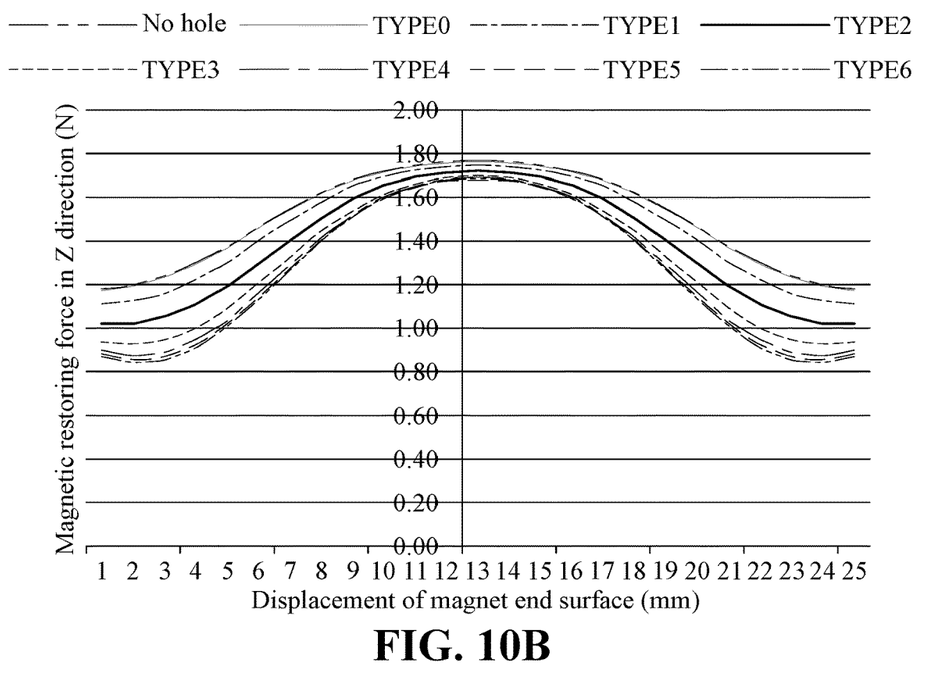

As aforementioned, the location and size of the hole will affect the strength of the magnetic attraction. FIGS. 7A-7F show schematic views of various implementations of the magnetically conductive element under the condition that the hole width and the external size are fixed; FIGS. 8A-8B are schematic views of the relationship between the magnetic restoring forces in the X direction and the Z direction and the displacement distance of the magnet end surface under a fixed hole width; FIGS. 9A-9H show schematic views of various implementations of the magnetically conductive element under the condition that the length of the hole and the external dimension are fixed; FIGS. 10A-10B are schematic views of the relationship between the magnetic restoring forces in the X direction and the Z direction and the displacement distance of the magnet end surface under the fixed hole length.

As shown in FIGS. 7A-7F and FIGS. 8A-8B, under the condition that the width of the hole and the external dimension of the magnetically conductive element are fixed, the hole with the size in the X direction from small (>0) to ¾ of the Z-opposite magnet can all increase the magnetic restoring force required for the movement direction. In addition, the hole size larger than ¾ of the Z-opposite magnet will produce a reverse magnetic restoring force during the stroke. FIGS. 8A-8B show the relationship between the magnetic restoring force in the X direction, the magnetic attraction force in the Z direction, and the displacement distance from the magnet end surface; the curves in the figure indicate various size configuration of the holes in FIGS. 7A-7F, including: no holes, Type0 (hole length is 0.1 mm), Type1 (hole length is ¼ of the Z-opposite magnet), Type2 (hole length is ²⁄₄ of the Z-opposite magnet), Type3 (hole length is ¾ of the Z-opposite magnet), Type4 (the hole length is equal to the Z-opposite magnet) respectively.

As shown in FIGS. 9A-9H and FIGS. 10A-10B, under the condition that the length of the hole and the external size of the magnetically conductive element are fixed, the hole with the size in the Y direction from small (>0) to 6/3 of the Z-opposite magnet can all increase the magnetic restoring force required for the movement direction. FIGS. 10A-10B show the relationship between the magnetic restoring force in the X direction, the magnetic attraction force in the Z direction, and the displacement distance from the magnet end surface; the curves in the figure indicate various size configuration of the holes in FIGS. 9A-9H, including: no holes, Type0 (hole width is 0.1 mm), Type1 (hole width is ⅓ of the Z-opposite magnet), Type2 (hole width is ⅔ of the Z-opposite magnet), Type3 (hole width is the same as the Z-opposite magnet), Type4 (hole width is 4/3 of the Z-opposite magnet), Type5 (hole width is 5/3 of the Z-opposite magnet), and Type6 (hole width is 6/3 of the Z-opposite magnet) respective.

In other embodiments, the hole of the magnetically conductive element may be a notch to cut off the upper or lower edge of the magnetically conductive element, so that the hole of the magnetically conductive element is in a notch-type hole. In other words, when the width Y-direction dimension L4 of the hole is greater than the width of the magnetically conductive element, it is a notch hole; when the width Y-direction dimension L4 of the hole is smaller than the width of the magnetically conductive element, it is a closed hole. The magnetically conductive element with notch-type holes can use both sides of the magnetically conductive element as end surfaces, or the end surfaces of the notch-type holes as end surfaces.

Figure 11:
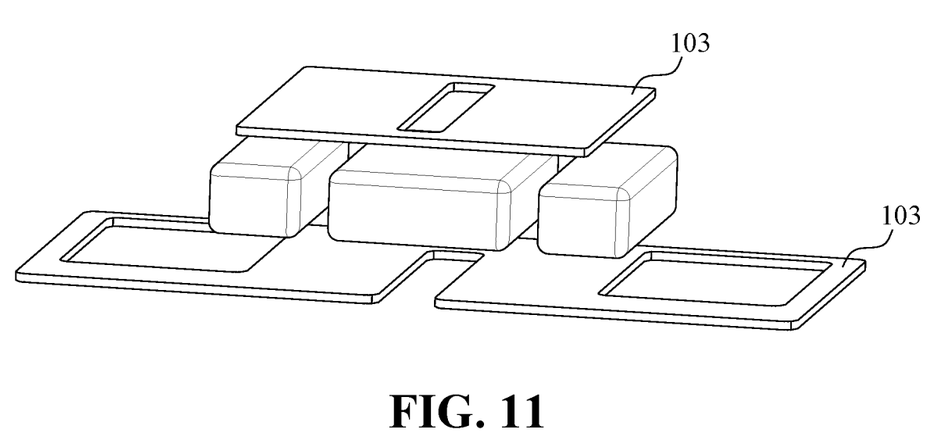
FIG. 11 is a schematic view of an embodiment of the magnetically conductive element with notch-type holes of the linear vibration motor of the present invention.

FIG. 11 is a schematic view of an embodiment of the magnetically conductive element with notch-type holes of the linear vibration motor of the present invention. As shown in FIG. 11, in the present embodiment, the upper and lower magnetically conductive elements have different specifications; the upper magnetically conductive element has a closed hole, and the lower magnetically conductive element has two wider closed holes and a narrower notch-type hole arranged between the two wider closed holes.

In other words, the Y-direction dimensions of the end surfaces of the upper and lower magnetically conductive elements may be the same and symmetrical, or different and asymmetric. Furthermore, the X-direction dimensions of the end surfaces of the upper and lower magnetically conductive elements may be the same and symmetrical, or different and asymmetric. Alternatively, the size of the holes in the X and Y directions of the upper and lower magnetically conductive elements may be the same and symmetrical, or different and asymmetric.

Similarly, in different embodiments, the holes of different types of the magnetically conductive elements can be stacked on one another to form a composite hole; in other words, the combined area of two or more holes. The composite hole can be superimposed on one side and both sides, and the final composite hole can be a closed hole or a notch-type hole.

Figure 12:
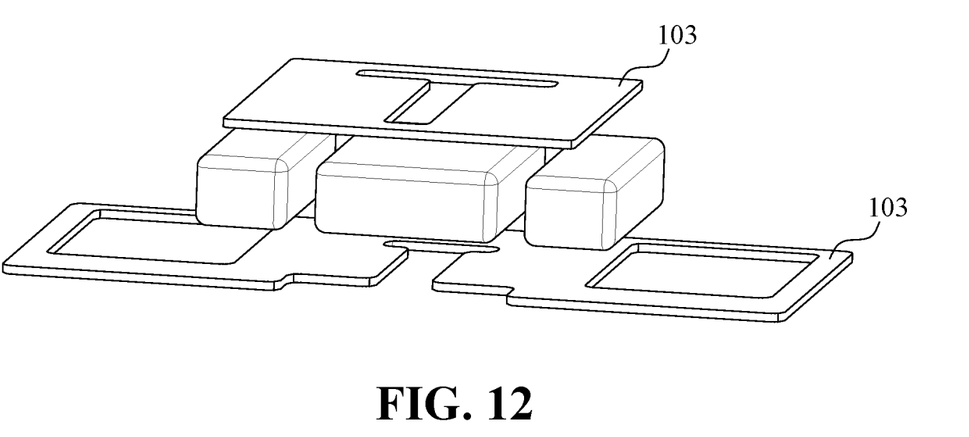
FIG. 12 is a schematic view of an embodiment of the magnetically conductive element with composite holes of the linear vibration motor of the present invention.

FIG. 12 is a schematic view of an embodiment of the magnetically conductive element with composite holes of the linear vibration motor of the present invention. As shown in FIG. 12, in the present embodiment, the upper and lower magnetically conductive element have different specifications; the upper magnetically conductive element has a closed composite hole, which is composed of two closed holes combined to form a T-shape holes; and the lower magnetically conductive element has two wider closed holes, and a composite notch-type hole arranged between the two wider closed holes, the composite notch-type hole is composed of two closed holes and a notch-type hole.

Furthermore, the dimensions of the composite holes in the X and Y directions can be the same and symmetrical or different and asymmetric.

In summary, the linear vibration motor of the present invention will be formed by the magnetic restoring force formed by the elastic stripe, the magnetically conductive element, and the magnet set under specific conditions so that the condition of $Ks=Ks'+Km$ is achieved. Once $Ks'<Ks$, the objective is achieved to reduce the spring constant of the elastic stripe of the suspension device, so that the elastic stripe can meet the required UZ rigidity support strength due to the addition of the magnetically conductive element, and avoid the problem of fatigue damage caused by excessive stress without adding additional support element.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A linear vibration motor, comprising: a movable part, a suspension device, and a fixed part; wherein the movable part further comprising at least one magnet set, the magnet set comprising at least three magnets arranged spaced apart, the magnets having an up-and-down magnetization direction, the adjacent magnets having opposite polarities when arranged; the fixed part at least comprising: a coil, at least one magnetically conductive element, and a housing; the magnet set of the movable part and the coil and the magnetically conductive element of the fixed part being arranged opposite to each other with a gap, both polar surfaces at both sides of the magnet set being facing opposite to the coil and the magnetically conductive element of the fixed part, and the size of the magnetically conductive element of the fixed part in the non-moving direction being greater than the size of the magnet set in the non-moving direction; the at least one magnetically conductive element being located above or below the magnet set; when the number of the at least one magnetically conductive element exceeding one, the magnetically conductive element being respectively arranged above and below the magnet set; the suspension device comprising two elastic stripes respectively located on both sides of the movable part, with one side of each elastic stripe connected to the movable part and the other side connected to the fixed part so that the movable part being supported by the suspension device and able to move freely relative to the fixed part; each of connecting ends of the elastic stripe having a height the same as the heights of the connecting ends of the movable part and the fixed part so that the suspension device staying in a straight and flat shape without bending at both connecting ends, wherein at least a hole is disposed on the magnetic conductive element, and the Z-opposite magnet is defined as the magnet opposite to the hole in the Z direction and causing magnetic force change when the hole moves.

2. The linear vibration motor according to claim 1, wherein the hole is a rectangular hole, and the four sides of the hole are respectively parallel to the four sides of the magnet set; and under the condition that the width of the hole is fixed, 0≤ the length of the hole≤¾ of the length of the Z-opposite magnet.

3. The linear vibration motor according to claim 1, wherein the hole is a rectangular hole, and the four sides of the hole are respectively parallel to the four sides of the magnet set; and under the condition that the width of the hole is fixed, 0≤ the length of the hole≤½ of the length of the Z-opposite magnet.

4. The linear vibration motor according to claim 1, wherein the hole is a rectangular hole, and the four sides of the hole are respectively parallel to the four sides of the magnet set; and under the condition that the width of the hole is fixed, ¼ of the length of the Z-opposite magnet≤ the length of the hole≤½ of the length of the Z-opposite magnet.

5. The linear vibration motor according to claim 1, wherein the hole is a rectangular hole, and the four sides of the hole are respectively parallel to the four sides of the magnet set; and under the condition that the length of the hole is fixed, 0≤ the width of the hole≤ the width of the Z-opposite magnet.

6. The linear vibration motor according to claim 1, wherein the hole is a rectangular hole, and the four sides of the hole are respectively parallel to the four sides of the magnet set; and under the condition that the length of the hole is fixed, 0≤ the width of the hole≤⅔ of the width of the Z-opposite magnet.

7. The linear vibration motor according to claim 1, wherein the hole is a rectangular hole, and the four sides of the hole are respectively parallel to the four sides of the magnet set; and under the condition that the length of the hole is fixed, ⅓ of the width of the Z-opposite magnet≤ the width of the hole≤⅔ of the width of the Z-opposite magnet.

8. The linear vibration motor according to claim 1, wherein the hole is a notch-type hole that cuts off the upper or lower edge of the magnetically conductive element; and the magnetically conductive element with notch-type hole uses end surfaces of the notch-type hole and end surfaces of the magnetically conductive element as end surfaces.

9. The linear vibration motor according to claim 8, wherein the holes of different types on the magnetically conductive element can be stacked on one another to form a composite hole; the composite hole is the joint area after two or more holes overlap, and the holes can be superimposed on one side or both sides, and the composite hole can be a closed hole or a notch-type hole.

* * * * *